United States Patent [19]
Lux et al.

[11] Patent Number: 5,225,876
[45] Date of Patent: Jul. 6, 1993

[54] RANGE FINDING CAMERA

[75] Inventors: Peter Lux, Langenargen; Max Eibert, Friedrichshafen, both of Fed. Rep. of Germany

[73] Assignee: Dornier Luftfahrt GmbH, Fed. Rep. of Germany

[21] Appl. No.: 632,051

[22] Filed: Dec. 21, 1990

[30] Foreign Application Priority Data

Dec. 23, 1989 [DE] Fed. Rep. of Germany ....... 3942770

[51] Int. Cl.$^5$ ........................ G03B 13/36; G03C 3/00
[52] U.S. Cl. ........................................ 354/403; 356/1; 356/2; 356/4
[58] Field of Search ....................... 354/403, 110, 113; 356/2, 4, 5, 375, 376; 358/95, 107; 352/39

[56] References Cited

U.S. PATENT DOCUMENTS

| | | | |
|---|---|---|---|
| 3,682,553 | 8/1972 | Kapany | 356/4 |
| 4,199,253 | 4/1980 | Ross | 356/5 |
| 4,687,325 | 8/1987 | Corby, Jr. | 356/4 |
| 4,687,326 | 8/1987 | Corby, Jr. | 356/5 |
| 4,708,473 | 11/1987 | Metzdorff et al. | 356/5 |
| 4,927,263 | 5/1990 | de Groot et al. | 356/5 |
| 4,954,867 | 9/1990 | Nagaoka et al. | 354/403 |
| 4,957,362 | 9/1990 | Peterson | 356/5 |
| 4,983,033 | 1/1991 | Suzuki | 354/403 |
| 5,013,151 | 5/1991 | Hughes | 356/152 |
| 5,048,950 | 9/1991 | Metzdorff et al. | 356/4 |

FOREIGN PATENT DOCUMENTS

| | | |
|---|---|---|
| 3732347 | 3/1989 | Fed. Rep. of Germany . |
| 3404396 | 4/1989 | Fed. Rep. of Germany . |
| 3840425 | 6/1990 | Fed. Rep. of Germany . |

Primary Examiner—Russell E. Adams
Attorney, Agent, or Firm—R. H. Siegemund

[57] ABSTRACT

The camera includes two functionally equivalent line and field scanners, one for issuing a light pulse that will be returned by an object point, and identified by a particular line/field scanning position in both scanners; the second scanner being attuned to recognize the returned light in one scanning raster point only for purposes of correlation. The field scan is realized through a deflecting mirror or in a columnal array the line scans are either solid state or fiber optics.

13 Claims, 6 Drawing Sheets

RANGE FINDING CAMERA

BACKGROUND OF THE INVENTION

The present invention relates to a range finding camera i.e. an imaging instrument for scanning a certain field of view and acquiring information on the distance of objects from the camera within that field of view. The principle of measurements depends on measuring the round trip period of time of a light signal from a particular source, to an object where it is reflected towards the camera; the period of time it takes from emission to detection, as far as that particular point is concerned, is directly indicative of the distance of that point from the camera. An entire field of view can be resolved in this fashion and each image point i.e. any point that is capable and does in fact reflect light is identified by such a round trip time and if for example a grey scale or a color scheme is signed to round trip periods then such a range image being colored or a grey scan image does not represent reflectivity but distance of objects in the field of view from the camera.

Range values on a matrix basis or the like can be evaluated and electronically processed otherwise. In this case there is an assignment of grey values, grid projection "false", color codes or the like and an image can be displayed on a suitable monitor. The production of a range image in this fashion realizes a so called active principle that means one does not depend on some kind of mere ambiance and on whatever is received from the ambiance, but of course in order to determine distances by timing, it is required that the light that is being reflected, is in fact produced in an accurately timed relation to the receiving of lights. Owing to this principle then the reflectivity of the object that reflects light i.e. the amplitude of the return light or better the relationship of the amplitude of the light that returns to the amplitude of the light that was transmitted gives another information content namely the regular reflectivity image. There may be reasons for using this information in addition.

The state of the art is exemplarily represented by U.S. Pat. Nos. 4,199,253 and 4,708,473 and German patents 38 40 425; 37 32 347.

DESCRIPTION OF THE INVENTION

It is an object of the present invention to provide a new and improved range imaging camera which is mechanically stable and of robust construction and permits a high picture taking speed.

In accordance with the preferred embodiment the range imaging camera includes a light source which emits light through a two dimensional scanning structure point by point in a line, and line-for-line for field scanning the scene; the camera further includes a receiver for the reflected light with a second scanning structure that associates returned light with particular points in that field of view and analogously on a point by point, line for line basis; an evaluating electronic which calculates round trip time of light as to each point in the field of view and includes the construction of a range image thereof. The scanning includes in all instances a point-by-point-on-a-line scanning structure and a line for line scanning arrangement including e.g. a pivotable mirror or two dimensional arrays. The principle behind the invention is to scan the field of view on a point by point basis with range establishing light, and the reflection is restricted to one point in a second scanning array whose position in that array assigns the received reflection to one particular point in that field of view, namely the point that was illuminated and identified by the light emitting scanner.

In the preferred form of practicing the invention at least one of the two scanners includes a fiber optic line scanner with a rotating element and which transforms a linear scanning pattern to a circular one or vice versa. One or the other or even both can be replaced by solid state devices.

DESCRIPTION OF THE DRAWINGS

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawings in which:

FIGS. 2-5 illustrate range imaging cameras with different line scanning techniques, but pivotable mirrors for field scanning; particularly

Figure 1:
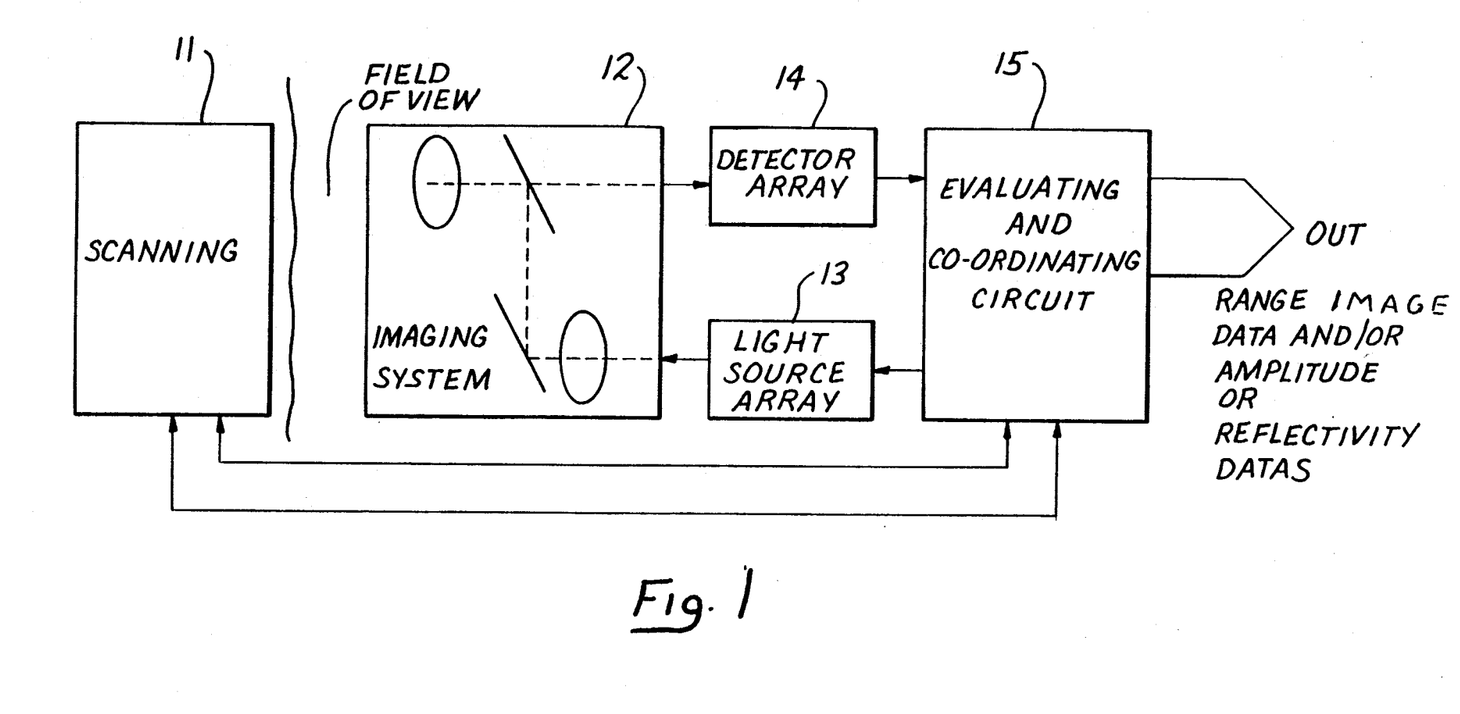
FIG. 1 is a block diagram of a range imaging camera constructed in accordance with the preferred embodiment of the present invention for practicing the best mode thereof.

Proceeding now to the detailed description of the drawings, FIG. 1 shows a range imaging camera with a two dimensional scanning stage 11 e.g. a line for line raster scan with line and column scanning procedure. The electronic control 11 that provides for this scan operates a control and evaluating electronic 15. The camera further includes an imaging system 12, a pulse continuous line light source array 13, a detector or receiver array 14. In addition, for evaluating and displaying range and amplitude data one will need a computer and microprocessor unit with monitor. The monitor is not shown in FIG. 1 but the processor equipment can be included in the circuit 15.

The output of FIG. 1 are suitably formated data in which the signal, on a point by point basis as far as the field of view is concerned, are amplitude or magnitude values in digital format. These amplitude values are indicative of the distances of the camera from the different objects in the field of view. Concurrently thereto that same image and view point may be represented by an amplitude data that means analog or digital information on the reflectivity of that particular point in the field of view.

The most important performance parameters of the range finder image camera are determined by the two dimensional scan. For system with a fairly large number of image points (pixels) one needs a rather high image frequency while on the other hand a large distance range is certainly a limiting factor. Another factor is the available power and the invention refers to improvement of all these aspects of the two dimensional scanning.

Figure 2:
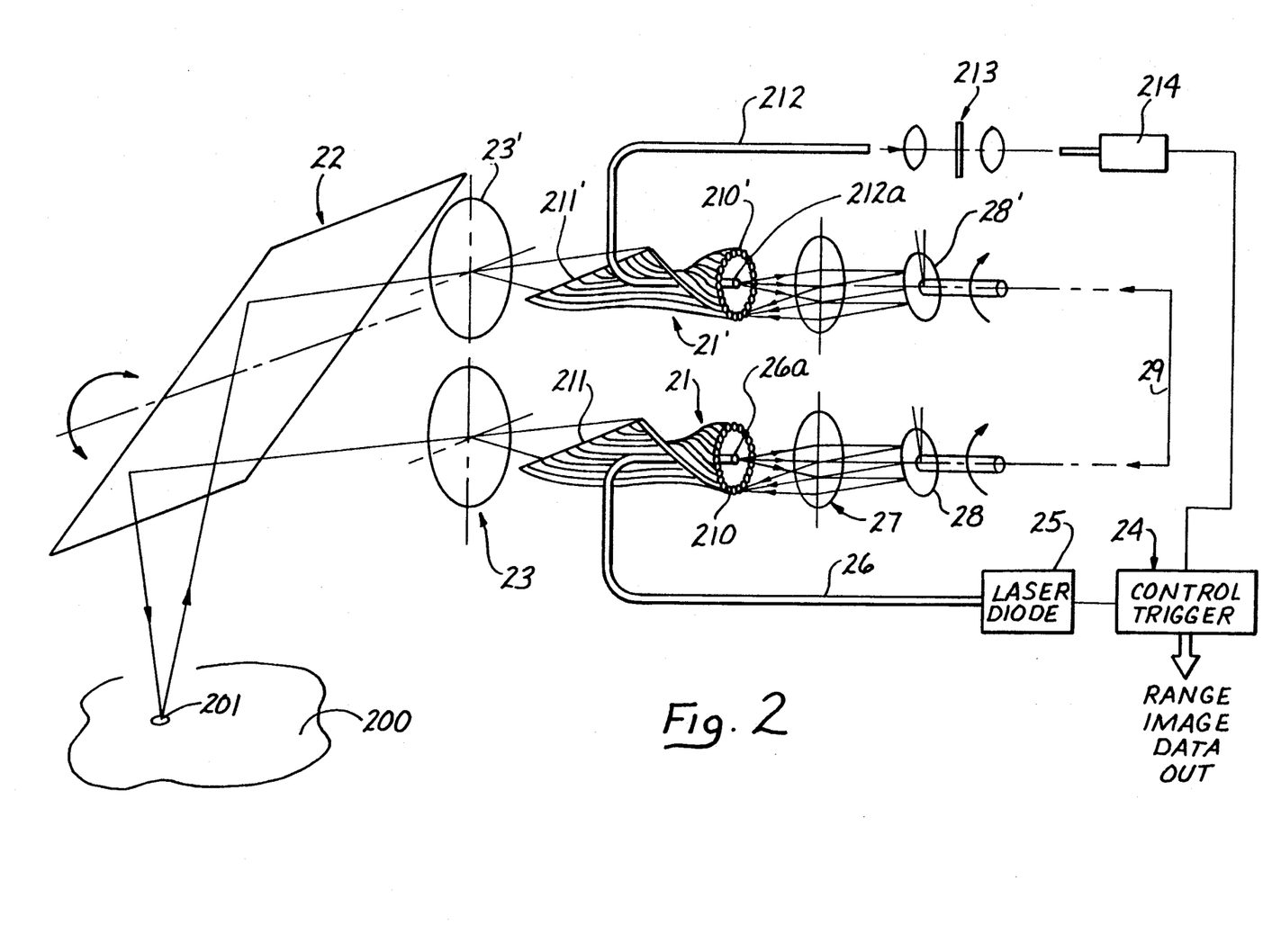
FIG. 2 illustrates a range finder camera generally in accordance with FIG. 1 but showing fiber optical scanning.

Proceeding to FIG. 2 the figure illustrates a range finder camera basically constructed as per FIG. 1 and using an optical mechanical scanning arrangement. The two dimensional scanning in this embodiment is divided into two domains. The left hand side i.e. the front area of the optics 23 and 23' is occupied by a pivotable mirror 22 or a comparable mechanically movable device to obtain the line for line, i.e. field scan. In other words the movable device 22 provides for the vertical or field scan. Reference numeral 200 is the field of view generally, and 201 denotes a particular point or pixel in that field. The scanning divides the field of view into a raster field of which pixel 201 is a component or constituent. Specifically, the distance of that spot from the camera will be determined as a local range information.

To the right thereof i.e. in front of the optics 23, 23' are two fiber optical line scanners 21, 21'. These fiber optical line scanners 21 and 21' each are comprised of a fiber bundle one end of which is arranged in a circle such as the circles 210 and 210'. The fiber optic of each of the bundles are twisted so that the respective other end forms a linear array such as 211 and 211'. The arrangement in fact is such that the fiber optic 210 converts a circular scanning light array, that is circularly arranged input fiber ends into a linear scan output captured by the optics 23 and directed to the mirror 22 for field deflection. On the other hand, linear scan signals received along the line 211' are converted by fiber optic 21' into an output spot that runs in the circle 210'.

Looking at certain other aspects of the FIG. 2 of the drawing, 24 is the particular electronic circuit which controls a laser diode transmitter 25. It does so by causing the laser diode 25 to emit pulses. The output of laser 25 is coupled to a single fiber 26 which is bent to set its output right into the center of the circle 210. The light pulse emerging from the exit window 26a is intercepted by an optic 27 and is directed to a slightly inclined, rotating mirror 28 which rotates around an axis that runs through that exit 26a which in turn is the center of the circle 210. The inclination of mirror 28 in conjunction with the optical transformation provided by the optic 27 causes the reflected light pulse arriving from 26a, to be set into an entrance windows of fiber optics 21 on the circle 210. As the mirror 28 rotates that light spot is progressively set into different entrance windows of and in the circle 210, and a line scan results on line 211. The optics 21 in effect provide a focal point transformation from the plane in which the circle 210 extends to a plane in the line 211.

The light that emerges from the scanning line output 211 appears in the plane as if it were produced in that plane and the optic 23 is attuned and adjusted accordingly for directing the light to the mirror 22 at whatever position it has particular, The light will reach an object point such as pixel 20 from which it is returned and captured and deflected again by the mirror 22 towards input optic 23' which provides an image into a particular entrance window on and along the scanning line 211'. The fiber optic bundle 21' converts the position of the point of light along that line 211' to a position in the circle 210' and owing to synchronism in rotation between the mirror 28 and the mirror 28' that point of light as it emerges from the circle 210' is reflected by the mirror 28' under cooperation of the optics 27' into the entrance window 212a of a fiber optic 212.

The entrance window 212a is positioned in the center of the circle 210' which is of course a point on the axis of rotation of the mirror 28'. An optical filter 213 is provided for background suppresion and this echo signal following filtering is detected by a photodetector 214 which is effect is situated on the exit side of the optic 212. The optic 212 in effect transposes the center of rotation 212a and of the scanning circle 210', in terms of an optical input to the input of the detector 214. That detector may be PIN diode or an avalanche photo diode or an appropriate receiver of that nature generating an electrical signal. Of course the lines 211 and 211' can also be understood to be the lines as provided within the field of view of a line scan. The mirror 22 pivots in a direction transversely thereto and provides the field scan.

The electronic circuit 24 processes the receiver signal, in addition to the transmitter signal and calculates from them a range or distance value. A particular electronic for purposes of the processing here is shown in German patent application P3915627 corresponding to U.S. Pat. No. 5,048,950 which does not constitute the part of the invention. It simply indicates the utility of such a signal that can be processed here. The copending application of one of us and another Ser. No. 632,063, allowed describes in fact a structure for realizing the particular fiber optical scanner shown in FIG. 2. That application includes other versions for realizing the point-to-circle scanning conversion. All these aspects are fully incorporated by reference.

It is important that the range finder camera uses a light scan spot that originates in a raster. The raster is generated by the light scan from the exit windows on linear array 211 and is directed into the field of view 200, with a field scan being superimposed by mirror 22 to cover that field of view 200 in a line for line raster scan. In any instant light will bounce back from one spot and is, however, scattered to some extent, optic 23 refocusses, but obviously more than one entrance of the linear window array 211' will receive light. However, by operation of the mirror 28, only one exit from circle 210' is coupled as in input to entrance 212a (as input to detection 214) and proper synchronization between the mirrors 28 and 28' (connector 29) ensures that there is strict correspondence between the raster points.

It should be mentioned that in FIG. 2 and also in the example to be described below with reference to FIGS. 3,4,6 all include a twin optic system which operates side by side as indicated by the optics 23 and 23', 27 and 27'. There is however an alternative mode possibly namely a coaxial system with one input side being e.g. on the inside and the output side being peripherally thereto. This is shown by way of a specific example in FIG. 5, but it can be adopted to FIG. 2 and others accordingly.

Figure 3:
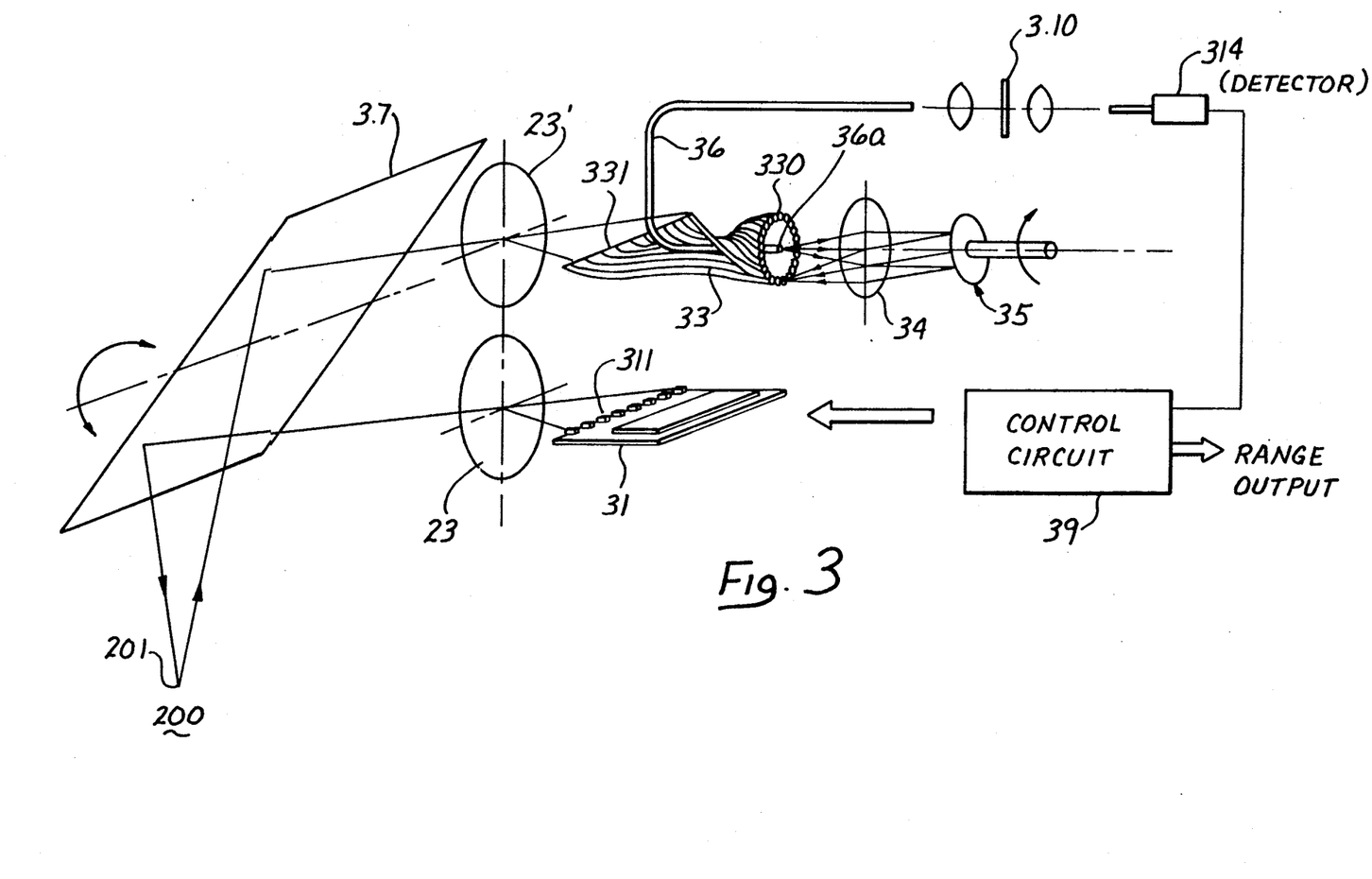
FIG. 3 is another more detailed version of FIG. 1 showing a range imaging camera with a fiber optical scanner and an electronic scanner.

Proceeding to the description of FIG. 3 it has to be realized that one of the inventive aspects is the consideration of symmetry between receiver function and transmitter side. The equivalency is demonstrated here in FIG. 3 in which there is provided a solid state electronic scan for one branch, either the transmitter or the receiver side, and a fiber optical mechanical scan is provided at the respective other branch. It does not make any difference which one is mechanical and which one is electronic. In this specific example the fiber mechanical structure is still the one in FIG. 2, on the receiver side, while solid state electronics is used in the transmitter branch.

In the particular way of illustrating the transmitter side is to be realized by a laser diode array 31 with integrated or separate multiplexer and control. In other words the light source line scanning is carried out strictly electronically without interposition of mechanical parts of the kind described with reference to FIG. 2 and which will be described with reference to the receiving branch. Element 31 is strictly a solid state unit which provides multiple light outputs at its end in a linear fashion. The line of diode outputs 311 is placed in the focal plane of the optic 23 just as was line 211 in FIG. 2. The particular circuit 31 includes as stated a plurality of laser diodes and each of these diodes in effect corresponds to a fiber end in the assembly 21 in FIG. 2.

A circuit 38 controls the operation of this laser linear array 31. The light that emerges from one of the points along the line 311 is by means of optics 23 directed onto a mirror 37 which in this case is also a pivotable mirror and provides the field scanning operation for covering image points 201 in the field of view 200 which is the same as before. The light that is reflected by the point 20 is redirected again by the mirror 37 and into a particular line and by means of optic 23', it is directed into a particular line which in this case is 331. It pertains as entrance windows, to a bundle of fiber optics 33 which in effect is similar to 21' in FIG. 2 and having on its output side a circle 330.

An optic or lens system 34 directs the light that emerges from one of the points along the circle 330 onto the rotating tilted mirror 35 which is arranged to redirect the light through the optic 34 into a center point 36a of the circle 330, the point pertaining as an entrance window to the fiber optic 36. After passage through a filter arrangement 310 to remove ambient light and thereby reduce the noise, the light is received by the receiver 314 which is equivalent to the device 214 in FIG. 2 and performs the same function. Analogously the output of the detector 314 is fed to the evaluating unit 38 and is processed with timing of firing pulses from the array 31.

As already stated it is possible to use a solid state electronic array in lieu of the fiber optical mechanical focal plane transformation and to use on the other hand the fiber optical mechanical focal plane transformation in the transmitter branch rather than the array 31. One can in fact also simply interpret FIG. 3 in a way that the direction of light be inverted and the result will then be that the transmitter branch includes the line 331, while 31 is an array of detector diodes.

Figure 4:
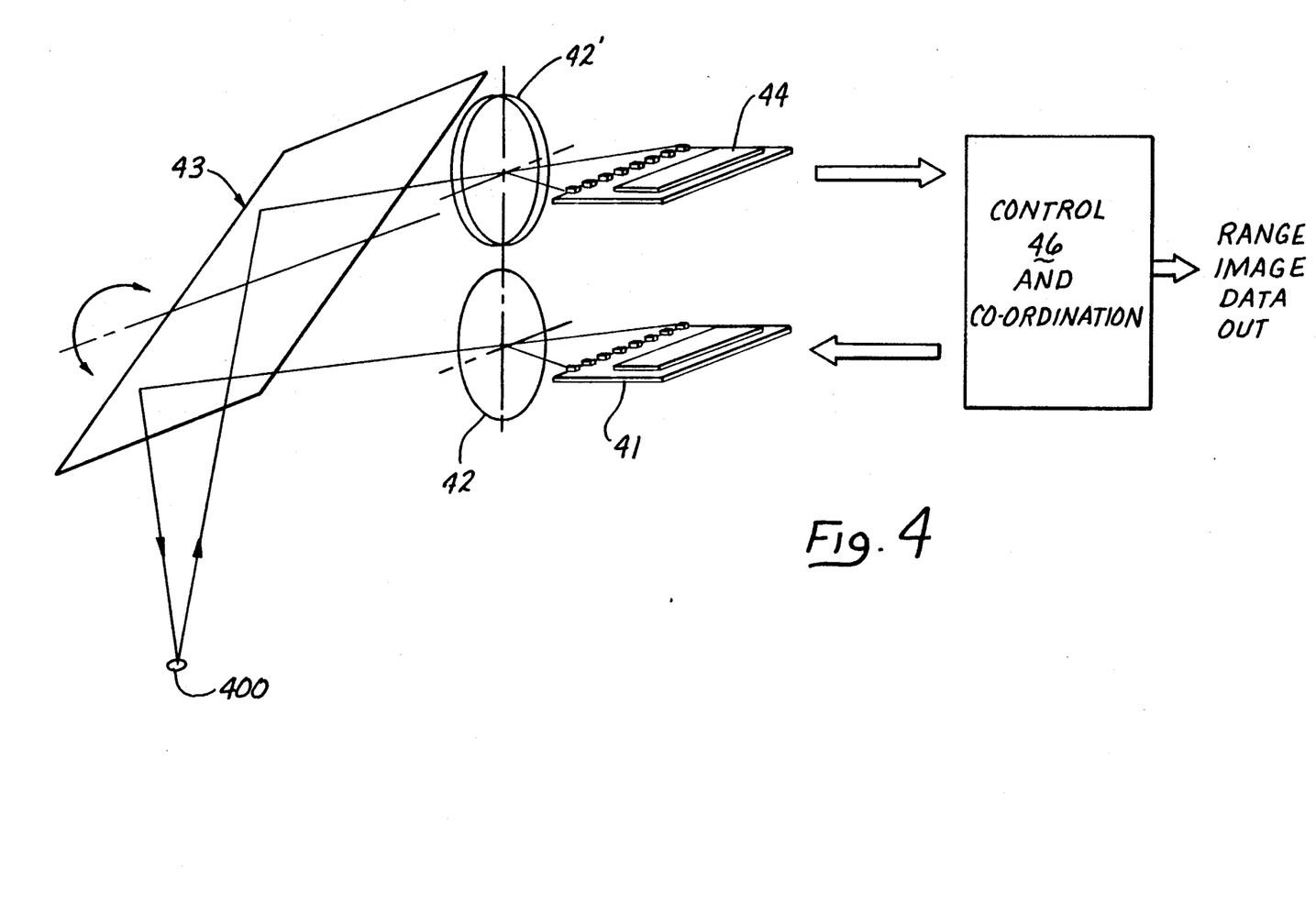
FIGS. 4 and 5 show two different range imaging cameras both with solid state electronic line scan arrangement.

Proceeding now to the description of FIG. 4 the figure shows purely solid state electronic line scan but a mechanical field scan. The mechanical scan involves the rotation or swivelling of the mirror 43, being analogous to 22 and 37 in the preceding figures. The line scan that the composition of the image in line direction is carried out exclusively through electronic devices. Here reference numeral 41 refers to a laser diode line array which is controlled through driver and multiplexer stages and is comprised of N laser diode chips arranged in a row. Basically this arrangement is similar to the array 31 in FIG. 3. The control and evaluation unit 46 is carried out serially accordingly. A light pulse emitted from the laser diode array 41 is imaged by operation of the imaging device optics 42 being equivalent to 23 in the preceding figures or to the mirror 43 which reflects that scanning spot onto an image point identified by pixel 400 in this figure, and the light that returns is intercepted by the mirror 43 and directed through the optics 42', being the other branch of the biaxial optic 42-42', onto the electronic receiver or detector array 44. The output signals thereof are processed by the circuit and control unit 46.

Proceeding now to FIG. 5 the fig. illustrates a range finder imaging camera with a solid state electronic scanning structure as was shown and described with reference to FIG. 4, but the arrangement illustrated in FIG. 5 involves coaxial objective system 53. In other words, functionally, array 51 and 54 correspond to arrays 41 and 44, but their physical layout may differ on account of cooperation with a different optical system.

Figure 5:
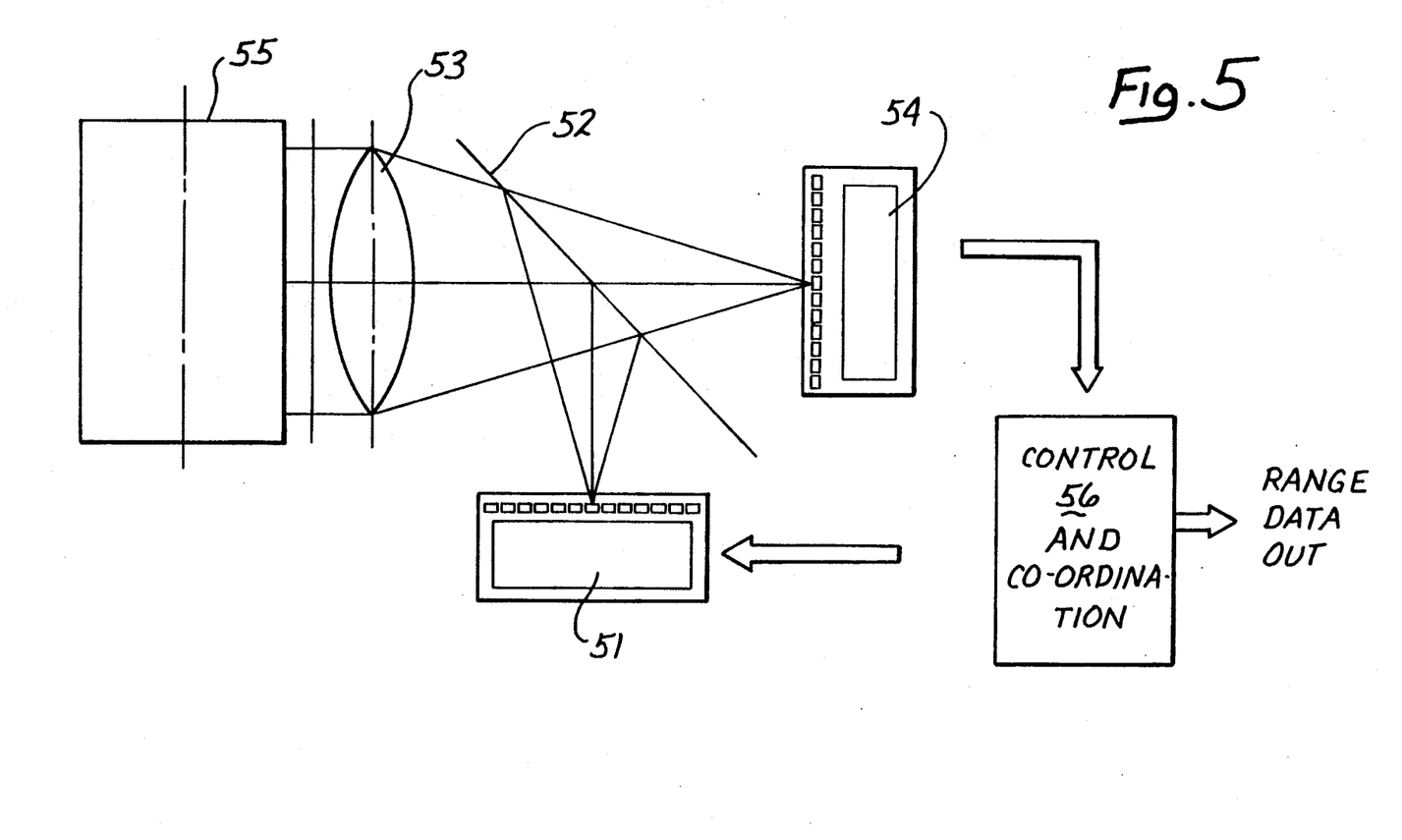

FIG. 5 moreover shows the laser diode array 51 transmitting light through a semitransparent mirror 52 onto the pivotable mirror 55 providing the column or field scan and under utilization of the coaxial optic 53. The return path is strictly coaxial and runs again through the optic 53 but the semitransparent mirror 52 permits the light to pass onto the receiver array 54. The device 56 is an evaluating circuit including a multiplexer and receiver circuitry and provides specifically for transit time evaluation just as in the other arrangements. The electrical and processing side is quite similar to the circuit as per FIG. 4, the difference strictly is in the optics of the arrangement.

Figure 6:
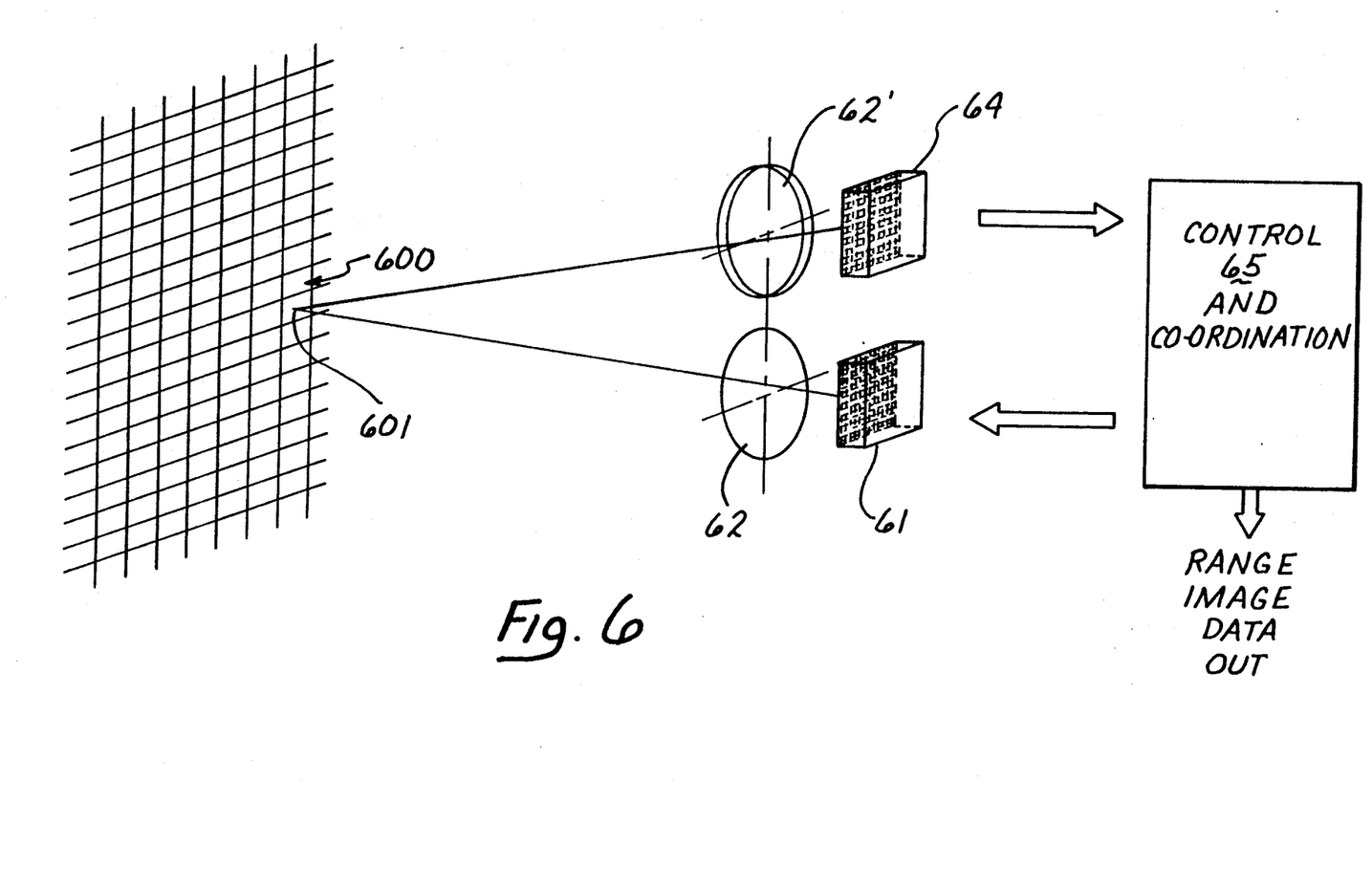
FIG. 6 is an example for the range imaging camera of FIG. 1 with solid state electronic field and line scanning.

FIG. 6 now illustrates a purely electronic field scan and line scan. In particular, reference numeral 61 refers to a two dimensional array of emitter diodes and reference numeral 64 refers to a two dimensional array of receiver diodes. Reference numerals 62 and 62' are optics equivalent to 23 and 23' and the field 60 under investigation shows raster point field with a particular raster pivot 601, there is no pivotable mirror in this case. The electronics for processing the controlling and coordinating timing in the entire field is designated by reference numeral 65.

It can readily be seen that in this case of course an arrangement equivalent to FIG. 5 can be used in that the optics are coaxial, rather than having separate beams as far as the arrays 61 and 64 are concerned. The pixel to pixel correspondence will be maintained in both cases, the arrays are shown in a rectangular field that can be square shaped but strictly speaking any other geometry such as a concentric or spiral pattern if the specific task at hand calls for such a pattern, can be of advantage.

The invention is not limited to the embodiments described above but all changes and modifications thereof, not constituting departures from the spirit and scope of the invention, are intended to be included.

We claim:

1. A camera for obtaining a two dimensional range image of a field of view, comprising:
    a light source means;
    a first, two dimensional scanning means for distributing light from the light source means into a two dimensional scanning array and including line and field scan for obtaining the distributing of the light in said field of view, serially and on a point by point basis, to produce a series of light pulses reflected by different points in the field of view;
    a second, two dimensional scanning means operating synchronously with the first scanning means for receiving light from the different points of and within the field of view according to the two dimensional scanning array of the first scanning means as duplicated by the second scanning means, and including signal means for the detection of arrival times of light as received by the second scanning means in accordance with the line and field scan by both of the scanning means;

at least one of the scanning means including a fiber optical line scanner having one fiber ends arranged in a line and being further provided with a rotating optical element at opposite fiber ends, the latter fiber ends at the opposite end being arranged in a circle and being optically coupled to the rotating optical element;

the field scanning of the first and the second scanning means being a shared movable optical element; and evaluating means connected to the first scanning means and to the signal means of the second scanning means for detecting the transit time of light pulses as fed by the first scanning means to the individual points in the field of view and as returned back by the points in the field of view to the second scanning means and for each point in the field of view separately for obtaining a two dimensional range image of that field of view.

2. Range finder imaging camera according to claim 1, said first and second two dimensional scanning means including a common field scan in terms of a movable reflector means.

3. A range imaging camera as in claim 2, one of the scanning means being a solid state linear array.

4. A camera for obtaining a two dimensional range image of a field of view comprising:

first scanning means for generating a light scan signal in the configuration of a light pulses that emanate, one pulse at a time, respectively from a plurality of exit windows, these light exit windows being arranged in a line;

second scanning means positioned for receiving reflected light signals, one at a time and through respective ones of a plurality of light entrance windows, also arranged in a line and in physical relation to the line of the plurality of exit windows so as to obtain an entrance window-to-exit window correspondence through a field of view in which the light pulses are reflected;

means connected to the first and second scanning means for operating them in synchronism so that a light scan signal that emerges from a particular exit window of the first scanning means and has been reflected by a point in the field of view towards the second scanning means, enters a particular entrance window of the second scanning means and is so recognized as having emanated from a particular exit window at a particular instant;

field scan means for operationally causing the light scan signals as emanating from the first scanning means and the reflected signal as received by the second scanning means, to be deflected transversely to the respective line scanning by the first and second line scanning means thereby scanning transversely to the line scan in the field of view; and means connected to the first and second scanning means for detecting as to each signal that emanates from an exit window and enters an entrance window a transit time and generating, point by point as to the field of view, a two dimensional range image, from the relative transit times of light signals as emanating from the first scanning means and as received by the second scanning means.

5. Range imaging camera as in claim 4, said field scan means including deflectable mirror means for deflecting the light pulses that emanate from the exits of the first scanning means transverse to the respective line and for directing a correspondingly reflected light signal to the respective light entrance window of the second scanning means.

6. Range imaging camera as in claim 4, at least one of said first and second scanning means including fiber optic means arranged with one end along the respective line and with a respective other end in a circle concentric to a particular point, there being rotating means for directing light as between said circle and said center point.

7. A range imaging camera as in claim 4, at least one of said first and second scanning means being a linear electronic array.

8. A range imaging camera as in claim 4, wherein said field scan means is integrated in said first and second means and that said the first scanning means has a two dimensional array of light exits and said second scanning means has a two dimensional array of light entrance windows.

9. A range imaging camera as in claim 4, said first and second scanning means including common coaxial optic means cooperating with field scan means.

10. A camera for obtaining a two dimensional range image of a field of view comprising:

a light source means;

a first, solid state two dimensional scanning means for distributing light from the light source means into a two dimensional scanning array and including line and field scan for obtaining the distributing of light in a field of view, serially on a point by point basis to produce a series of light pulses reflected by different points in the field of view;

a second, solid state two dimensional scanning means operating synchronously with the first scanning means for receiving light from the different points of and within the field of view according to the two dimensional scanning array of the first scanning means as duplicated by the second scanning means, and including means for the detection of arrival times of light as received by the second scanning means in accordance with the line and field scan by both the scanning means; and evaluating means connected to the two scanning means for detecting the transit time of light pulses as fed by the first scanning means to the individual points in the field of view and as returned back by the points in the field of view to the second scanning means and for each point in the field of view separately for obtaining a two dimensional range image of that field of view.

11. A camera for obtaining a two dimensional range image, of a field of view comprising:

a light source means;

a first line scanning means for distributing light from the light source means in a one dimensional scanning array, serially and on a point by point basis to produce a series of light pulses to be reflected by different points in a field of view;

a second line scanning means operating synchronously with the first scanning means, for receiving light from the different points of and within the field of view according to the one dimensional scanning array of the first scanning means as duplicated by the second scanning means, and including means for the detection of arrival times of light as received by the second scanning means in accordance with the line and field scan by both the scanning means;

field scan means interposed between the first and second line scan means to deflect the light as distributed by the first scanning means prior to reflection by the field of view and again subsequent to that reflection but prior to receiving by the second line scanning means; and evaluating means connected to the two scanning means for detecting the transit time of light pulses as fed by the first scanning means to the individual points in the field of view and as returned back by the points in the field of view to the second scanning means and for each point in the field of view separately for obtaining a two dimensional range image of that field of view.

12. A camera as in claim 11, at least one of the line scanning means including a fiber optical line scanner having one fiber ends arranged in a line and being further provided with a rotating optical element at an opposite fiber end the fiber ends at the opposite end being arranged in a circle.

13. A camera as in claim 11, at least one of the line scan means being a linear solid state device.

* * * * *